Dec. 5, 1939.  A. H. VAUGHAN  2,181,928
FORCED CIRCULATION FUEL FIRED FURNACE
Filed Aug. 13, 1937  4 Sheets-Sheet 1

Inventor
Arthur H. Vaughan
By Frease and Bishop
Attorneys

Dec. 5, 1939.  A. H. VAUGHAN  2,181,928
FORCED CIRCULATION FUEL FIRED FURNACE
Filed Aug. 13, 1937  4 Sheets-Sheet 2
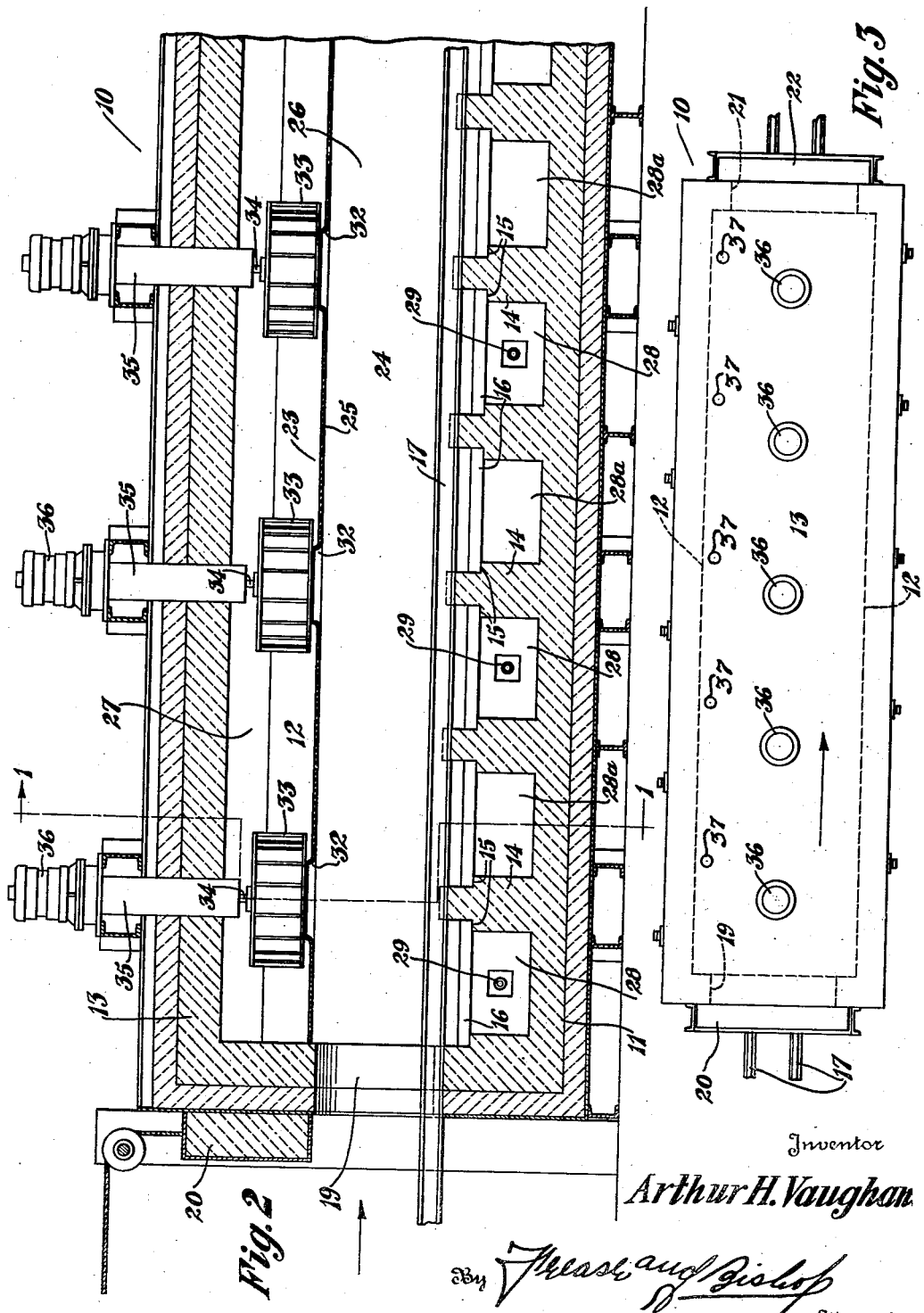

Patented Dec. 5, 1939

2,181,928

UNITED STATES PATENT OFFICE 2,181,928

FORCED CIRCULATION FUEL FIRED FURNACE

Arthur H. Vaughan, Salem, Ohio, assignor to The Electric Furnace Company, Salem, Ohio, a corporation of Ohio Application August 13, 1937, Serial No. 158,951

7 Claims. (Cl. 263—43)

The invention relates generally to furnaces and is particularly applicable to direct fuel fired continuous furnaces used for the heating or heat treatment of metals or alloys or metal products, as by annealing. More particularly, the invention relates to an improved furnace construction in which a low temperature annealing may be carried out while utilizing a high flame temperature, and to the attainment of uniform heating and heat distribution in such furnaces.

Forced circulation furnaces have been provided in which one or more combustion chambers are utilized, separate from the furnace, and communicate with the furnace heating chamber by long ducts through which the gases from the combustion chamber are forced by a fan. However, such constructions involve large heat losses from the duct work, separate combustion chamber and fan chamber; and restrict the volume of hot gases circulated, due to the friction losses incident to the forced passage of the gasses through the duct work.

Other forced circulation furnaces have been provided in which the duct work and combustion chamber are not located outside the walls of the furnace, but are located, by a complicated series of chambers and passages, either in the roof or below the hearth of the furnace; so as to almost double the overall size of the furnace and the heat loss incident thereto. Such furnaces not only have large heat losses, but, because of the complicated duct arrangement and friction losses incident thereto, are restricted as to the volume of gases which may be circulated through the heating chamber proper.

Moreover, in each of these two prior types of furnaces, there is a relatively large rise or fall in temperature of the heating gases in each cycle of gas circulation, so that there is a lack of uniformity in heating.

Furnaces have been used in which forced circulation is provided by a fan located in or adjacent to the heating chamber, but ordinarily a propeller type fan has been utilized in such cases, which is not as effective as a centrifugal fan. Centrifugal fans have ordinarily only been used in forced circulation furnaces having the outside duct work previously referred to.

A number of types of furnaces have been provided with forced circulation by utilizing a fan within the furnace chamber, but all of such furnaces have been batch type furnaces as distinguished from continuous furnaces. These batch type furnaces are not adapted for carrying out a continuous heat treating operation and cannot handle large or bulky articles.

Furnaces have been provided in which forced circulation is provided in the heat treating chamber by utilizing a fan in or adjacent thereto; but such furnaces utilize either electric resistors for heating, or a separate non-communicating fuel fired heating chamber. The circulation in such furnaces amounts to nothing more than a stirring up of the air within a retort that is essentially externally heated. Obviously, the cost of carrying out a heat treating operation in such furnaces is relatively high as compared with utilizing a direct fuel fired furnace.

Accordingly, it is a general object of the present invention to provide a forced circulation fuel fired furnace, preferably of the continuous type, capable of handling large and bulky objects which avoids all of the prior art difficulties discussed above.

More particularly, it is an object of the present invention to provide a forced circulation furnace which eliminates the use of external ducts and piping, the heat losses incident thereto, and the bulky and expensive construction thereof.

Likewise, it is an object of the present invention to provide a forced circulation fuel fired furnace in which a very large volume of hot gaseous combustion products may be circulated and recirculated through the heating chamber twenty or thirty or more times without friction losses incident to the use of complicated duct work.

Moreover, it is an object of the present invention to provide a forced circulation furnace in which temperature uniformity in the heating chamber is greatly improved by the reduction in heat losses and by an increase in the volume of gases recirculated due to the low temperature rise or fall per circulation cycle, which results in a very uniform heating of the objects being heat treated.

It is a further object of the present invention to provide a forced circulation furnace construction in which the effectiveness of a centrifugal fan, as compared with a propeller fan, may be advantageously used within or adjacent to the heating chamber.

Moreover, it is an object of the present invention to provide a forced circulation furnace construction suitable for use in continuous furnaces of large size capable of handling large and bulky articles and of continuously heat treating the same.

Likewise, it is an object of the present invention to provide a forced circulation heat treating furnace in which direct fuel fired heating means having a high flame temperature is utilized to carry out low temperature heat treatment very uniformly by the constant recirculation of the hot gaseous products of combustion twenty to thirty or more times.

Likewise, it is an object of the present invention to provide a forced circulation fuel fired furnace construction of the continuous type in which a plurality of burners, in some cases in staggered relation, are utilized preferably directly below the heating chamber to heat the objects being heat treated; and in which forced circulation of the hot gases is accomplished by utilizing a plurality of fans along the length of the furnace, each serving approximately a square hearth area to recirculate the hot gases a large number of times through the heating chamber.

And finally, it is an object of the present invention to provide a forced circulation fuel fired furnace construction, which can be applied to standard constructions of continuous furnaces of various types without materially altering the size of such furnaces for a given capacity, and without interfering with the usual means of carrying the work through a continuous furnace; and in which the above objects and results may be obtained.

The foregoing and other objects may be obtained by the furnace constructions, apparatus, parts, improvements, operations, combinations and sub-combinations which comprise the present invention, the nature of which is set forth in the following general statements, preferred embodiments of which, together with their modes of use or operation, are set forth in the following description, and which are particularly and distinctly pointed out and set forth in the appended claims forming part hereof.

The nature of the improvements of the present invention may be described in general terms as including in heat treating furnace construction, a heating chamber preferably provided with entrance and exit passages, a checkered hearth, a plurality of combustion chambers below the hearth communicating with the heating chamber through the hearth, fuel burners communicating with the combustion chambers, substantially horizontally disposed material carrying means for passing material to be heat treated continuously through the heating chamber above the hearth, a baffle structure in the heating chamber so constructed as to define a heating space and a recirculating passage between the heating space and furnace roof and walls communicating with the upper part of the heating space and the combustion chambers apertures formed in the baffle structure above the heating space to form fan intakes and centrifugal fans in said passage one adjacent each intake, discharging horizontally into said passage to recirculate gases from said heating space through said passage into the combustion chambers and back into the heating space.

By way of example, several embodiments of the present improvements are illustrated in the accompanying drawings forming part hereof in which Figure 1 is a cross section taken on the line 1—1, Fig. 2 through a continuous fuel fired furnace provided with the improved forced circulation means;

Fig. 2 is a longitudinal section taken through a portion of the furnace shown in Fig. 1;

Fig. 3 is a diagrammatic plan view of the furnace shown in Figs. 1 and 2;

Similar numerals refer to similar parts throughout the several figures of the drawings.

Figure 1:
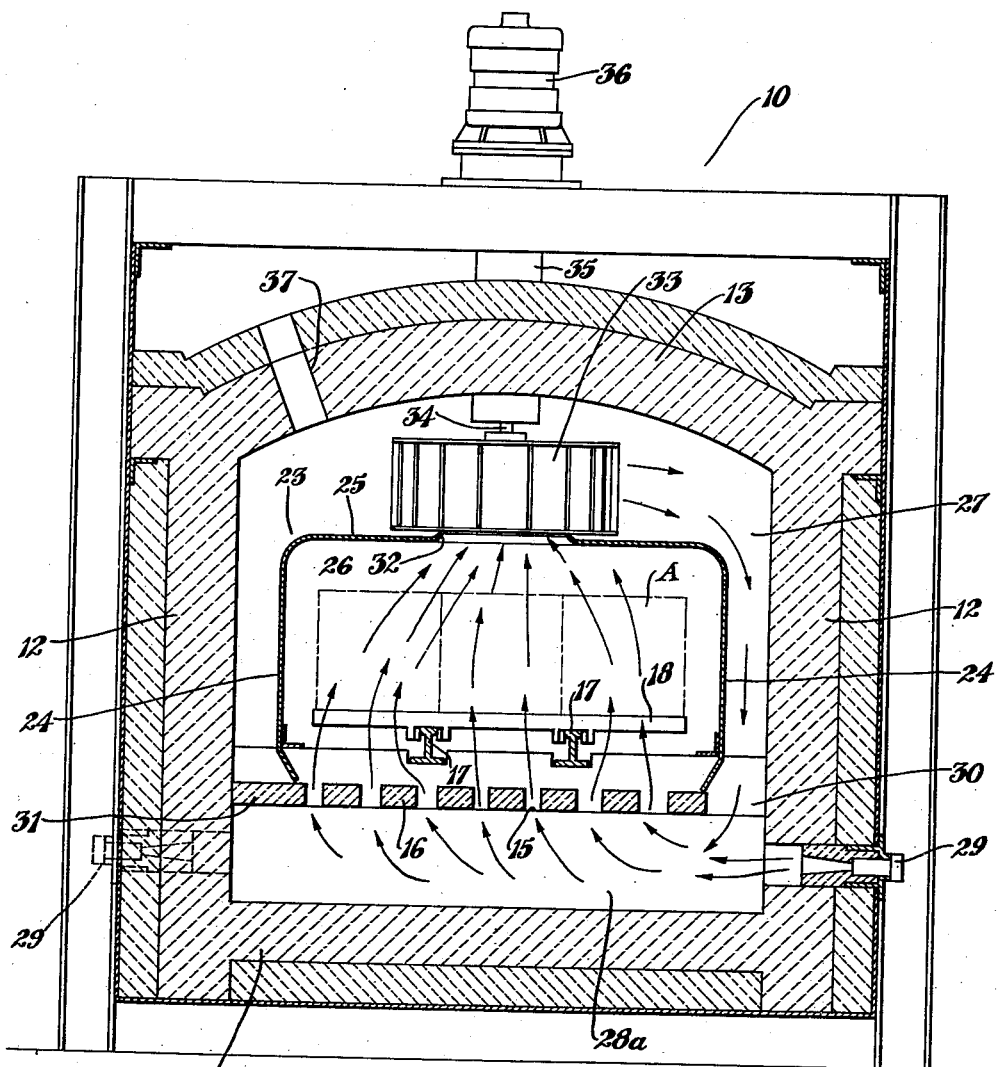

Referring to Figs. 1, 2 and 3, a gas fired forced circulation continuous furnace is generally indicated at 10, and may be used for carrying out heat treating operations at temperatures generally from 800° to 1500° F., such as low temperature annealing of metals or metal materials diagrammatically illustrated in Fig. 1 by dot-dash lines at A. As shown, the furnace is relatively large, so that a continuous heat treatment of large and bulky objects A may be carried out.

The furnace 10 may include a bottom wall 11, side walls 12 and a roof wall 13 of usual construction; and cross piers 14 may extend upward from the bottom wall 11 at intervals (Fig. 2) provided with ledges 15 for supporting longitudinally extending spaced refractory blocks 16 to form a checkered or open hearth.

The furnace 10 may be provided with any usual or suitable work or material carrying means such as rails, conveyor chains, driven rollers or the like, for carrying the work or material to be heat treated in a horizontal mass above the hearth. As shown, the work carrying means may include rails 17 supported on the cross piers 14, along which lattice-like trays 18 may be pushed, the work A to be heat treated being loaded on the trays 18 in such a manner as to provide large passages between and around the work.

The furnace 10 may be provided with the usual entrance passage 19 (Fig. 2) and door 20 for introducing material into the furnace, and a similar exit passage 21 and door 22 may also be provided.

Referring particularly to Fig. 1, a baffle structure, generally indicated at 23, may extend longitudinally of the furnace; and the baffle structure 23 preferably is made of heat resistant sheet or plate metal and includes side members 24 spaced from the furnace side walls 12 and a top member 25 spaced from the furnace roof 13 so as to define a heating or work space 26 within the baffle structure 23 above the hearth 16, and so as to also form a passage 27 between the heating or work space 26 and the furnace side walls 12 and roof 13.

The piers 14 form a plurality of combustion chambers 28 and 28a below the hearth 16 (Fig. 2) and each combustion chamber may be provided with a fuel burner 29. In the form of the invention shown in Figs. 1 to 3, the burners 29 are staggered so that viewing Fig. 1, every other burner is on the left hand side and intervening burners are on the right hand side, the right hand burners communicating with combustion chambers 28a and the left hand burners communicating with combustion chambers 28.

Referring to Fig. 1, the hearth is so constructed that the passage 27 communicates with each combustion chamber 28 or 28a, at 30, adjacent to the burner 29 for that combustion chamber; and the lower end of the passage 27 is blocked off from communication with each combustion chamber at the end of the combustion chamber farthest from the burner for that combustion chamber, as indicated at 31 in Fig. 1.

The upper wall 25 of the baffle structure 23 is provided at intervals with apertures 32 to form intakes for centrifugal fans 33 mounted directly above the baffle structure and apertures in the passage 27. Each fan 33 may be mounted on a shaft 34 journaled in a housing 35 preferably equipped with a water cooled bearing, the housing 35 extending through the furnace roof 13 and driven by a motor 36 supported by the furnace superstructure.

As shown in Figs. 2 and 3, a plurality of fans 33 are mounted within the furnace 10, each fan serving approximately a hearth area equal in length and width; and in the arrangement shown in Figs. 1, 2 and 3, each fan 33 has two combustion chambers 28 and 28a below the same.

The centrifugal fans 33 discharge gases sucked in through apertures 32 horizontally and then down passage 27, to the right to combustion chambers 28a, and to the left to combustion chambers 28, into said combustion chambers, where they immediately mix with the flame issuing from burners 29 so that the cooler gases recirculated are heated up by the hot flame and cool down the hot flame. The mixture of gases then passes upward through the checkered hearth into the heating space 26 and again to fans 33, as indicated generally by arrows applied to Fig. 1.

The furnace 10 may be supplied with one or more vents indicated generally at 37 for the discharge of spent gases; and burners 29 may be so controlled, together with the volume of gases moved by the fans 33, that any given volume of gas is recirculated from twenty to thirty or more times within the furnace walls and through the heating space 26 after it enters the combustion chambers through burners 29 and before it leaves the furnace through vent 37.

In this manner, although a high flame temperature is efficiently used in the combustion chambers, the flame temperature is reduced by a volume of thirty times as much gas (if recirculation occurs thirty times), which is at a temperature of about that being maintained within the heating space; and the heating space is entirely surrounded by constantly moving gases of approximately the same temperature so that a very uniform heating and heat distribution occurs in the heating space around the materials to be heated.

Figure 4:
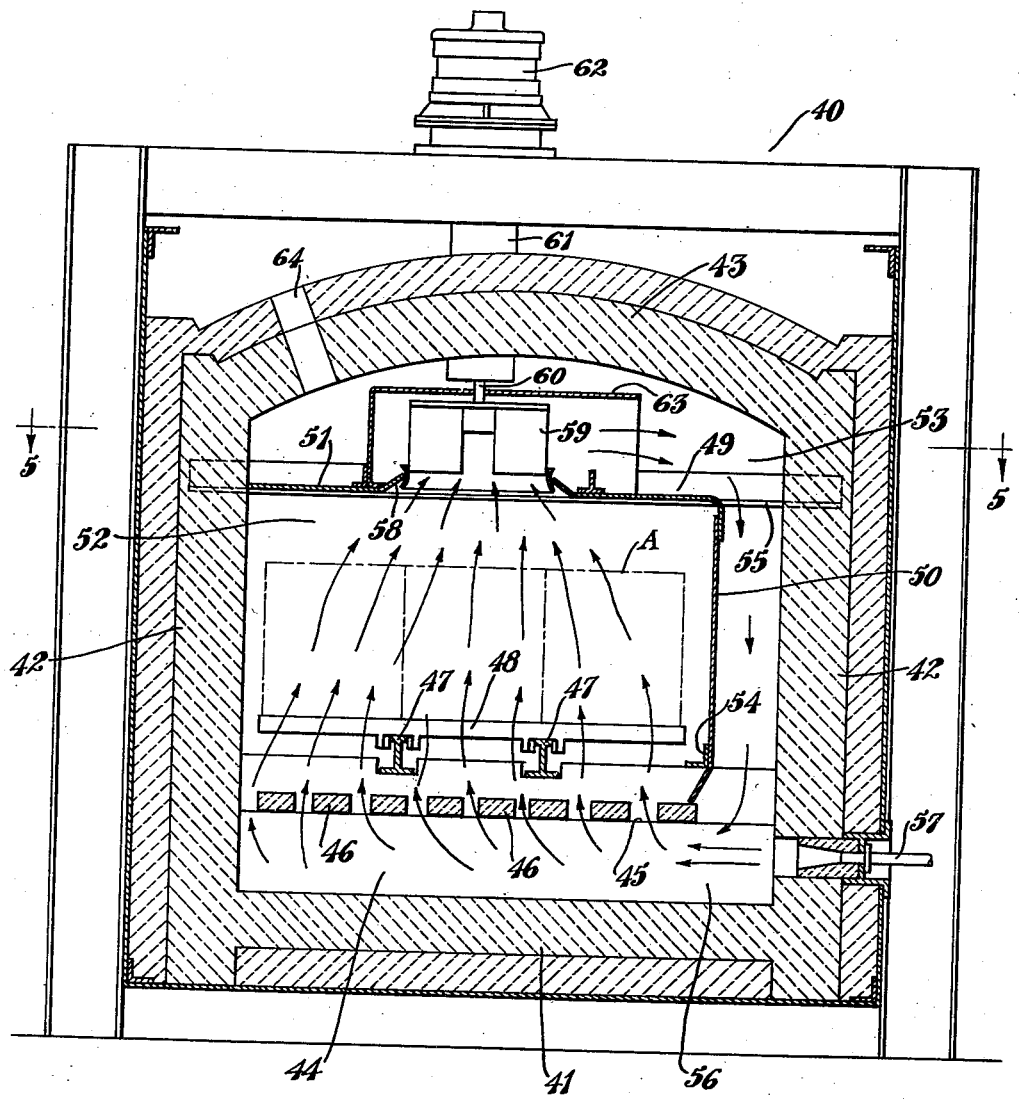
Fig. 4 is a view similar to Fig. 1 of a modified form of construction.
Figure 5:
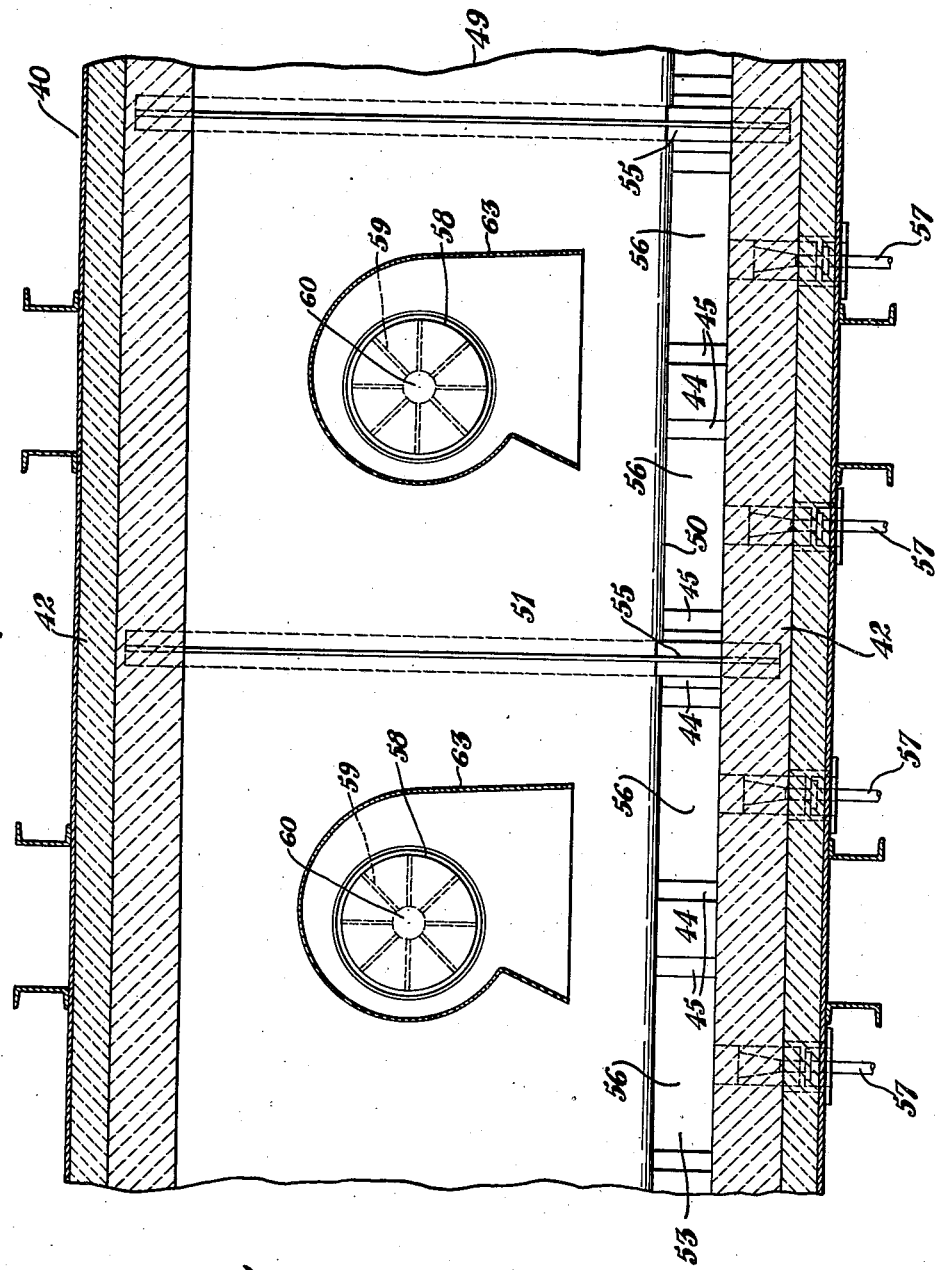
Fig. 5 is a fragmentary plan sectional view taken on the line 5—5, Fig. 4.

Referring to Figs. 4 and 5, a gas fired forced circulation continuous furnace is also shown therein having a somewhat modified form of the invention. The furnace is generally indicated at 40 and may be used for carrying out heat treating operations such as a low temperature annealing of metals or metal materials diagrammatically illustrated in Fig. 4 at A. As shown, the furnace is relatively large so that a continuous heat treatment of large and bulky objects A may be carried out.

The furnace 40 may include a bottom wall 41, side walls 42 and a roof wall 43 of usual construction; and cross piers 44 may extend upward from the bottom wall 41 at intervals. The cross piers 44 are provided with ledges 45 for supporting longitudinally extending spaced refractory blocks 46 to form a checkered or open hearth.

The furnace 40 may be provided with any usual or suitable work or material carrying means such as rails, conveyor chains, driven rollers or the like for carrying the work or material to be heat treated in a horizontal mass above the hearth.

As shown, the work carrying means includes rails 47 supported on the cross piers 44, along which lattice-like trays 48 may be pushed, the work A to be heat treated being loaded on the trays 48 in such a manner as to provide large passages between and around the work.

The furnace 40 may be provided with the usual entrance and exit passages and doors, not shown, similar to those in the furnace shown in Figs. 1 to 3.

Referring particularly to Fig. 4, a baffle structure generally indicated at 49, may extend longitudinally of the furnace; and the baffle structure 49 preferably is made of heat resistant sheet or plate metal and includes a side member 50 spaced from the right hand (Fig. 4) furnace side wall, and a top member 51 spaced from the furnace roof 43 so as to define a heating or work space 52 within the baffle structure 49 above the hearth 46, and so as to also form a passage 53 between the furnace roof and right hand furnace side wall. The baffle member 50 is preferably supported by an angle member 54 mounted on top of piers 44 and the baffle member 51 may be supported by T's 55 carried by the furnace side walls 42.

The piers 44 form a plurality of combustion chambers 56 below the hearth 46 and each combustion chamber may be provided with a fuel burner 57. In the form of the invention shown in Figs. 4 and 5, the burners 57 are all on one side of the furnace and the hearth is so constructed that the passage 53 communicates with each combustion chamber 56 adjacent to the burner 57 for that combustion chamber.

The upper baffle member 51 is provided at intervals with apertures 58 to form intakes for centrifugal fans 59 mounted directly above the baffle structure and apertures. Each fan may be mounted on a shaft 60 journaled in a housing 61 preferably equipped with a water cooled bearing, the housing 61 extending through the furnace roof 43 and driven by a motor 62 supported by the furnace structure.

Each fan may be surrounded by a partial involute fan casing 63 to improve the fan performance and direct the flow from each fan horizontally toward the right, viewing Fig. 4. As shown in Fig. 5, a plurality of fans are mounted within the furnace 40, each fan serving approximately a hearth area equal in length and width; and in the arrangement shown in Figs. 4 and 5, each fan 59 has two combustion chambers 56 below the same.

The centrifugal fans 59 discharge gases sucked in through apertures 58 out of fan casing 63 horizontalaly in and then downward in passage 53 into the combustion chambers 56, where they immediately mix with the flame issuing from burners 57 so that the cooler gases recirculated are heated up by the hot flame and cool down the hot flame. The mixture of gases then passes upward through the checkered hearth into the heating space 52 and again to furnace 59, as indicated generally by arrows applied to Fig. 4.

The furnace 40 may be supplied with one or more vents indicated generally at 64 for the discharge of spent gases; and burners 57 may be so controlled, together with the volume of gases moved by the fans 59, that any given volume of gas is recirculated from twenty to thirty or more times within the furnace walls and through the heating space 52 after it enters the combustion chambers through burners 57 and before it leaves the furnace through vent 64.

In this manner, a high flame temperature is efficiently used to carry out low temperature work with an even heat distribution and uniform heating in a manner similar to the way in which it is carried out in the form of the invention shown in Figs. 1, 2 and 3.

Accordingly, the present invention eliminates the expensive and bulky ducts and piping of prior art structures and heat and friction losses incident thereto; enables a larger volume circulation to be maintained through the elimination of friction losses in such ducts; provides a forced circulation suitable for large sized continuous furnaces for handling bulky articles; enables a more uniform temperature to be maintained in forced circulation furnace construction; enables the use of centrifugal fans within the furnace chamber of forced circulation furnaces; and enables the use of direct fuel fired furnace construction with high flame temperatures in carrying out low temperature heat treating operations.

Having now described the features of the invention, the construction, operation and use of preferred forms of the same, and the advantages and results obtained by the use of the same; the new and useful parts, elements, combinations, constructions and devices, and reasonable mechanical equivalents thereof obvious to those skilled in the art are set forth in the appended claims.

I claim:

1. In a continuous heat treating furnace having a bottom wall and an apertured hearth spaced therefrom, walls forming a heating chamber above the hearth, baffle means in said heating chamber forming a work space and a recirculating passage communicating with the work space and the space between the hearth and bottom wall, burner means firing into the space between the hearth and bottom wall adjacent to said passage communication therewith, fan means in said passage having intake communication with said work space, and means for passing material to be treated through said work space.

2. In a continuous heat treating furnace having a bottom wall and an apertured hearth spaced therefrom, walls forming an elongated heating chamber above the hearth, baffle means extending longitudinally in said heating chamber forming a work space and a recirculating passage communicating with the work space and the space between the hearth and bottom wall, a plurality of burners on one side of said furnace firing into the space between the hearth and bottom wall adjacent to the passage communication therewith, fan means in said passage having intake communication with said work space, and means for passing material to be treated through said work space.

3. In a continuous heat treating furnace having a bottom wall and an elongated substantially rectangular apertured hearth spaced therefrom, walls forming a plurality of combustion chambers beneath the hearth, walls forming a heating chamber above the hearth, baffle means in said heating chamber forming a work space and a longitudinally extending recirculating passage located above and beside the work space and communicating with the work space and the combustion chambers, a plurality of burners staggered on opposite sides of the furnace arranged with one burner firing directly into each combustion chamber adjacent to the passage communication therewith, a plurality of centrifugal fans in said passage having intake communication with said work space, each fan serving approximately a square hearth area, and means for passing material to be treated through said work space.

4. In an underfired heat treating furnace having bottom, roof and side walls, an apertured hearth spaced from the bottom wall and forming a heating chamber thereabove, burner means firing directly into the space between the bottom wall and hearth, baffle means in the heating chamber forming a work space and a recirculating passage communicating adjacent to said burners with the space between the hearth and bottom wall, and fan means in said passage having intake communication with said work space for withdrawing gases from the work space; whereby the gases are recirculated through the passage, discharged into the space between the bottom wall and hearth, mixed directly with the relatively hotter burner flame gases, and the mixed gases then passed through the hearth and through the work space.

5. In a continuous heat treating furnace, walls forming an elongated heating chamber, a baffle structure in the heating chamber having longitudinally extending parts constructed so as to define an elongated work space and a passage above the work space, walls forming combustion chamber means communicating with the work space and with said passage, means for passing material to be heat treated through said work space, burner means firing directly into said combustion chamber means, and fan means in said passage for recirculating gases from the work space into the combustion chamber means adjacent to the burner means and then back to the heating chamber.

6. In a continuous heat treating furnace having walls forming an elongated heating chamber, a metal baffle structure in the heating chamber having longitudinally extending substantially horizontally and vertically disposed parts constructed so as to define an elongated work space and a recirculating passage above and beside the work space, walls forming combustion chamber means communicating with said work space, burner means firing directly into said combustion chamber means, said passage communicating with said work space and also communicating with said combustion chamber means adjacent to said burner means, and means in said passage for recirculating gases from said work space to said combustion chamber means and back to said work space.

7. In heat treating furnace construction, walls forming a heating chamber, an apertured hearth, a plurality of combustion chambers below the hearth communicating with the heating chamber through the hearth, burner means firing directly into said combustion chambers, substantially horizontally disposed material carrying means for passing material to be heat treated through the heating chamber above the hearth, a metal baffle structure in the heating chamber having longitudinally extending horizontally and vertically disposed parts constructed so as to define a work space around the material carrying means and a recirculating passage above and beside the work space communicating with the combustion chambers adjacent to the burner means therefor, apertures formed in the horizontally disposed part of the baffle structure above the work space to form fan intakes, and a centrifugal fan in said passage adjacent each intake discharging horizontally into said passage and then downward in the passage beside the work space to said combustion chambers to recirculate gases from said work space through said passage into the combustion chambers to there mix with the burner flame gases and to then pass the mixed gases through the hearth and through the work space.

ARTHUR H. VAUGHAN.